United States Patent [19]
Debuysscher et al.

[11] Patent Number: 4,813,037
[45] Date of Patent: Mar. 14, 1989

[54] SWITCHING SYSTEM

[75] Inventors: Pierre L. Debuysscher, Nazareth; Jan G. Bauwens, Wilrijk; Michel P. M. DeSomer, Aalst, all of Belgium

[73] Assignee: Alcatel NV, Amsterdam, Netherlands

[21] Appl. No.: 4,367

[22] Filed: Jan. 15, 1987

[30] Foreign Application Priority Data

Jan. 24, 1986 [BE] Belgium ............... 904100

[51] Int. Cl.$^4$ ........................... H04Q 11/04
[52] U.S. Cl. ........................... 370/60; 370/94
[58] Field of Search ........... 370/94, 60, 62, 58, 370/54, 64; 340/825.52, 825.53

[56] References Cited

U.S. PATENT DOCUMENTS

| | | | |
|---|---|---|---|
| 4,603,416 | 7/1986 | Servel et al. | 370/94 |
| 4,630,258 | 12/1986 | McMillen et al. | 370/94 |
| 4,638,475 | 1/1987 | Koike | 370/60 |
| 4,679,190 | 7/1987 | Dias et al. | 370/94 |
| 4,701,906 | 10/1987 | Ransom et al. | 370/60 |
| 4,707,831 | 11/1987 | Weir et al. | 370/60 |
| 4,712,214 | 12/1987 | Meltzer et al. | 370/60 |
| 4,720,854 | 1/1988 | Sand | 370/60 |
| 4,730,305 | 3/1988 | Acampora et al. | 370/60 |

FOREIGN PATENT DOCUMENTS 210686 6/1979 United Kingdom .

OTHER PUBLICATIONS

IEEE Proceedings, vol. 127, Pt. E, No. 6, Nov. 1980, pp. 233—240.
Electronic Design, vol. 30, No. 21, Oct. 1982, pp. 193-200.
International Switching Symposium, May 7-11, 1979, Paris FR, Session 40A1, pp. 757-764.
International Switching Symposium, May 7-11, 1984, Florence IT Session 41B, Paper 1, pp. 1-7.
International Switching Symposium, Sept. 21-25, 1981, Montreal CA, Session 42B, Paper 5, pp. 1-7.
"Performance Analysis and System Design of a Variable Bit-Rate Hybrid Switch", by L. Gabrielli et al, Telecom '83, (4th World Telecommunication Forum), pp. 2.8.5.1-2.8.5.6.
"Design of Multiservice Variable Bit-Rate Systems", by M. R. Miller et al, Telecom '83 (4th World Telecommunication Forum), pp. 2.8.8.1.-2.8.8.5.

Primary Examiner—M. H. Paschall
Attorney, Agent, or Firm—Peter C. Van Der Sluys

[57] ABSTRACT

A switching system using an asynchronous packet switching technique is provided wherein the packets may contain voice, data or video signals. The switching speed is increased through the use of a processor analyzing only specified packets, said processor being located out of the transmission path of the packets. The processor may process the specified packets at a lower speed than the transmission speed of the switching system. A header correction circuit is used to improve the quality of the transmission.

17 Claims, 1 Drawing Sheet

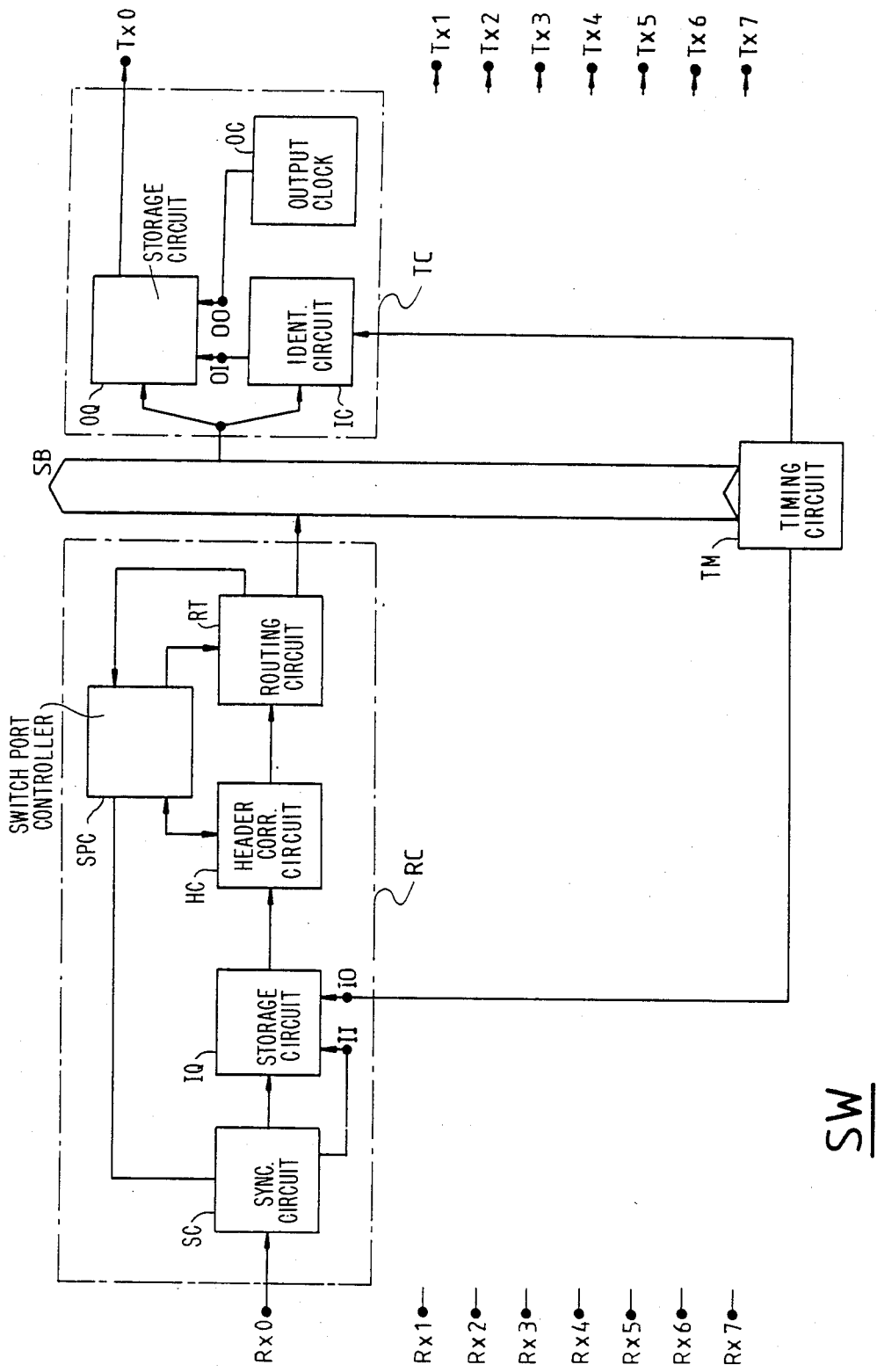

SWITCHING SYSTEM

BACKGROUND OF THE INVENTION

1. Field of the Invention

The present invention relates to a switching system for switching digital signals applied to any one of a plurality of input terminals thereof to any one of a plurality of output terminals thereof, said switching system including common switching means, a plurality of input means each coupling one of said input terminals to said common switching means, and a plurality of output means each coupling said common switching means to one of said output terminals.

2. Description of the Prior Art

Such a switching system is already known in the art, e.g. from the article 37 ITT 1240 Digital Exchange-Digital Switching Network" by J. M. Cotton et al, published in "Electrical Communication ", Volume 56, No. 2/3 - 1981, pages 148 to 160. This known system is only able to switch, with a switching quality allowing real time communication, signals (e.g. voice) having a same frequency range and generated by signal sources sending a fixed number of bits per second or bitrate.

SUMMARY OF THE INVENTION

An object of the present invention is to provide a switching system of that type but which is able to switch, with a switching quality similar to the one mentioned above, signals such as voice, data and video having different frequency ranges and different bitrates.

This object is achieved due to the fact that said signals are grouped in packets having a header containing routing information and in that each of said input means includes processor means coupled to routing means also included in said input means, said routing means being coupled between said one of said input terminals and said common switching means and being able to route said packets to said processor means or, through said common switching means, to one of said output terminals according to said routing information contained in the header of the packet, said processor means being able to indicate said one of said output terminals to said routing means in response to packets received by said processor means.

In this way, the number of packets generated by a signal source in a second is proportional to the bitrate and to the frequency range of that signal. Furthermore, since all the headers of the packets are not systematically handled by the processor means, the operation speed of the latter processor means may be lower than the one of the routing means.

Another characteristic feature of the present switching system is that said common switching means operate at a predetermined clock frequency and in that each of said input means include input storage means for storing said signals and having an input portion coupled to said one of said input terminals and operating at the frequency of the signals supplied to said one of said input terminals, and an output portion coupled to an input of said routing means and operating at said predetermined clock frequency to supply said stored signals to said common switching means.

Still another characteristic feature of the present switching system is that the frequencies of at least two of the signals supplied to distinct ones of said plurality of input terminals are different.

In this way, the system operates in a fully asynchronous way so that the frequencies of the signals supplied at the input terminals are independent of the predetermined clock frequency of the common switching means.

Also another characteristic of the present switching system is that said predetermined clock frequency of said common switching means is equal to the product of a maximum allowed value of said signal frequency and of said plurality of input terminals.

Thus the common switching means are non-blocking.

The present invention also relates to a switching system for switching digital signals, grouped in incoming packets having a header, applied to any one of a plurality of input terminals thereof to any one of a plurality of output terminals thereof, said switching system including common switching means, input means coupling said plurality of input termianls to said common switching means, and output means coupling said common switching means to said plurality of output terminals.

Such a switching system is already known in the art. A drawback of the known system is that when, due to errors, the header becomes faulty in accordingly adversely affects the transmission quality of the system.

An object of the present invention is to provide a switching system of the above type but with an improved transmission quality.

According to the invention this object is achieved due to the fact that said input means include header correction means to correct faulty ones of headers of said incoming packets.

Due to the header being corrected the transmission quality of the system is improved.

The above mentioned and other objects and features of the invention will become more apparent and the invention itself will be best understood by referring to the following description of an embodiment taken in conjunction with the accompanying drawing.

DESCRIPTION OF THE DRAWING

The drawing is a block diagram showing a switching system SW according to the invention.

DETAILED DESCRIPTION OF THE INVENTION

A plurality of such switching systems SW are interconnected to constitute a switching network included in a digital telecommunication exchange to which user stations are coupled via asynchronous time division transmission links. The switching network is able to establish virtual communication paths for various types of signals such as voice, data and video transmitted by the user stations. More particularly, the input signals applied to the network inputs via an asynchronous time division transmission link are digital signals grouped in packets having a fixed length and comprising a header and data. Each packet or a portion thereof is transmitted in a timeslot of the asynchronous time division transmission link. Likewise, the output signals appearing at the network outputs are also digital signals grouped in packets. The rate of both the input and output digital signals may be variable but has an upper limit of e.g. 280 Megabits/second. There may be no relation between the rates of the input signals and those of the output signals, these rates being a function of the tarnsmission links and of the devices coupled to the switching network through these links.

To be noted that the above input digital signals are accompanied by a clock signal having a frequency corresponding to the input signal rate and which is necessary to synchronize the transmission of these signals to the asynchronous time division transmission link. This clock signal may be supplied either separately on a different link or is preferably included in the input signals.

The above switching system SW has 8 input terminals $RX0$ to $RX7$ and 8 output terminals $TX0$ to $TX7$ and further includes a common switching bus SB to which each of the input terminals $RX0$ to $RX7$ is coupled via distinct input means or receive circuits, and which is coupled to each of the output terminals $TX0$ to $TX7$ via distinct output means or transmit circuits. A combination of a receive circuit with a corresponding transmit circuit in a same switching system is called a switch port. Since the 8 receive circuits and the 8 transmit circuits of the switching system SW are respectively identical, only one of each, i.e. only one switch port comprising the receive circuit RC to which the input terminal $RX0$ is connected and the transmit circuit TC connected to the output terminal $TX0$, is represented in detail.

The receive circuit RC includes between the input terminal $RX0$ and the switching bus SB the cascade connection of a synchronization circuit SC, an input storage circuit IQ, a header correction circuit HC and a routing circuit RT. RC also includes a processor or switch port controller SPC controlling SC and RT. An output of RT is connected to SPC and the latter is also bidirectionally connected to HC. Furthermore, the input storage circuit IQ comprises an input portion controlled via a control terminal II by the synchronization circuit SC, and an output portion controlled via a control terminal IO by a timing circuit TM coupled to and controlling the switching bus SB.

The transmit circuit TC includes an identification circuit IC, an output storage circuit OQ and an output clock OC. The switching bus SB is connected to the identification circuit IC which is controlled by the timing circuit TM.

The output storage circuit OQ comprises an input portion to which the switching bus SB is connected and which is controlled by the identification circuit IC via a control terminal OI, and an output portion connected to the output terminal $TX0$ and which is controlled by the timing circuit TM.

The output storage circuit OQ comprises an input portion to which the switching bus SB is connected and which is controlled by the identification circuit IC via a control terminal OI, and an output portion connected to the output terminal $TX0$ and which is controlled by the output clock OC via a control terminal OO.

The timing circuit TM is adapted to generate synchronous Time Division Multiplex (TDM) frames comprising 8 timeslots or channels on the switching bus SC. Each of these timeslots is allocated to one receive circuit and the sampling frequency of the switching bus SB is mainly equal to 2,240 Megabits/second. This frequency is equal to the product of the 8 receive circuits with the above mentioned maximum allowed input rate of the signals at the input terminals $RX0$ to $RX7$, i.e. 280 Megabits/second. In this way, the maximum possible delay for a packet present in the receive circuit RC to be loaded on the switching bus SB is mainly equal to the time spent in waiting until the timeslot corresponding to this particular receive circuit RC appears on the switching bus SB.

Each of the above input/output terminals of the switching system SW is coupled by an asynchronous time division transmission link to an upstream/downstream located device which may either be another similar switching system or a user station. The upstream located device is able to feed digital signals to the input terminals $RX0$ to $RX7$ of the switching system SW under the form of packets containing a header and data. These packets have, e.g., a fixed length of 16 bytes two of which being used as header and may be:

control packets which are transmitted to establish and/or to update a virtual communication path in the switching system SW and contain information about this path;

synchronization packets which are used to synchronize the operations of the upstream located device and the switching system SW. At least one of these packets is transmitted within an allocated predetermined time interval;

normal communication packets which contain communication data.

To be noted that the switching system SW also includes input serial-to-parallel and output parallel-to-serial conversion circuits (not shown) in order to first convert the serial input signals in a parallel form and to then convert the parallel form into output serial signals.

The operation of the above switching system SW is described hereinafter. When the above input digital signals are applied, under the form of input packets, to the input terminal $RXO$ they are loaded in the synchronization circuit SC. The latter includes a clock extraction circuit (not shown) which extracts the clock signal from the input digital signals and applies it to the control terminal II of the input portion of the input storage circuit IQ. Under the control of this clock signal the digital input signals are then loaded into IQ and when the latter contains the digital signals of a complete packet, e.g. 16 bytes, this packet is fed to the header correction circuit HC under the control of the timing circuit TM which operates via the control terminal IO.

The header of a packet applied to HC might be modified due to errors, e.g. occurring during the transmission of the input digital signals from the upstream located device to the switching system SW. As a result, the transmission quality of the virtual communication path used is adversely affected. It may even happen that the faulty header is equal to the header of a packet belonging to another virtual communication path so that also the transmission quality of the latter path is adversely affected.

The purpose of the header correction circuit HC is to improve the overall system quality by correcting the received faulty headers, and to collect information which is indicative of the reliability of the system. To this end, HC includes means (not shown) to process the header of a received packet, the data of this packet being directly transmitted to the routing circuit RT. Normal communication packets are then transmitted to the switching bus SB, whereas synchronization or control packets are supplied to the SPC. The processing of the header consists of comparing the incoming header with valid headers contained in a table (not shown) or calculated by means of an algorithm. If the incoming header is equal to one of the valid headers, it is correct and therefore is sent to the routing circuit RT. On the contrary, if the incoming header is not equal to one of the valid headers, this incoming header is faulty and therefore it is replaced, e.g. by the valid header which has the nearest value. This new header is then sent to the routing circuit RT. Each time a correction is performed, a correction counter (not shown) included in HC is incremented so that the value contained in this counter is indicative of the reliability of the system. The number of corrections stored in the correction counter is permanently known by the switch port controller SPC owing to the bidirectional link between HC and SPC. When this number exceeds a predetermined value, SPC is able to take appropriate actions, e.g. to inform the telecommunication exchange of a faulty operation of the receive circuit RC or of the upstream located device, and to reset the value of the correction counter to zero.

As mentioned above control packets and synchronization packets supplied to input terminal R×0 of the receive circuit RC are fed through SC, IQ, HC and RT and are finally stored in SPC. The latter includes means (not shown) to analyze the packets received and to thereby distinguish between control packets and synchronization packets.

In the case of control packets, which for instance contain information on a virtual communication path to be established, the SPC communicates to the routing circuit RT an outgoing header to be used to replace the incoming header of the incoming packets to route further these packets on the virtual communication path. More particularly, the incoming header, the outgoing header and also the address of the transmit circuit of SW forming part of the virtual communication path are stored, as long as this path remains established, in a routing table (not shown) included in the routing circuit RT. In this way, when a virtual communication path has been established the routing circuit RT replaces the incoming header of each incoming packet of that path by the associated outgoing header and transmits the modified packet and the address of the associated transmit circuit to the switching bus SB.

It is to be noted that control packets may also be received when a virtual communication path is already established. These packets contain then information to update that virtual communication path, i.e. the outgoing header and/or the address stored in the routing table of the routing circuit RT.

When the transmission of the packets on the virtual communication path occurs in a synchronous manner at least one synchronization packet will be received by SPC within the predetermined time interval allocated to the synchronization packet and no action is taken by SPC. On the contrary, when the SPC does not receive such a synchronization packet within this time interval, it orders the synchronization circuit SC to delay by one or more bits the signals received at the input terminal R×0. As a consequence, the packets transmitted by the output portion of the input storage circuit IQ to the routing circuit RT are shifted by as much bits. This operation is repeated until the routing circuit RT recognizes the header of a synchronization packet which is then transmitted to the SPC.

It is to be noted that the header and the data of a same normal communication packet should arrive simultaneously at the switching bus SB. But, since only the header is processed by HC and by RT, it may be subjected to a small delay during its transmission from IQ to SB. Therefore, the data of a packet are latched in IQ for a longer time than the header.

It is also to be noted that, with the aim to reduce the number of the parallel links and thus the dimensions and the control of the switching bus SB, the packets of 16 bytes which arrive thereat are split into four portions of 4 bytes each comprising a part of the header and a part of the data. These four portions are regrouped in a complete packet of 16 bytes in the output storage circuit OQ.

The operation of the transmit circuit TC is considered hereinafter.

The identification circuit IC forming part of the transmit circuit TC shown is synchronized to the timeslots of the switching bus SB by the timing circuit TM. It is able to read the various addresses of the transmit circuits which have been loaded in these timeslots by the routing circuit RT in the way described above. When IC, among the addesses read, recognizes the address of its own transmit circuit TC, the header and the data of the packet also loaded in that same timeslot are transferred from the SB to the output storage circuit OQ. This transfer is controlled by IC via th control terminal OI. From there, the packets are transmitted on the asynchronous time division transmission link connected to T×0. Because the transfer of packets occurs at the rate of the timeslots of SB whereas the transmission from T×0 is performed at the rate of the output clock OC which is much lower than the first mentioned rate, OQ is sufficiently large to store a queue of packets such that in practice no packets can be lost. The maximum length of this queue obviously depends on the expected maximum communication traffic able to flow through the transmit circuit TC. Furthermore, the delay introduced in the virtual communication path by a switch port mainly depends on the current length of the queue.

It is to be noted that, as for the rate of the input signals, the rate of the output signals and therefore the frequency of the output clock OC may also be variable. The maximum value of the rate of the output signals is for instance also 280 Megabits/second.

The ability to change the transmission rate of the input and of the output signals is useful to adapt these rates to the properties of the transmission links and of the coupled devices so that a same switching system SW may be used to switch a wide frequency range of signals such as voice, data and video as mentioned above.

While the principles of the invention have been described above in connection with specific apparatus, it is to be clearly understood that this description is made only by way of example and not as a limitation on the scope of the invention.

We claim:

1. Switching system (SW) for switching digital signals applied to any one of a plurality of input terminals (R×0 to R×7) thereof to any one of a plurality of output terminals (T×0 to T×7) thereof, said switching system including common switching means (SB, TM), a plurality of input means (RC) each coupling one of said input terminals to said common switching means, and a plurality of output means (TC) each coupling said common switching means to one of said output terminals, characterized in that said signals are in packets the form of having a header containing routing information and in that each of said input means (RC) includes processor means (SPC) coupled to routing means (RT) also included in said input means, said routing means being coupled between said one of said input terminals (R×0 to R×7) and said common switching means (SB, TM) and being able to route said packets to said processor means or, through said common switching means, to one of said output terminals (T×0 to T×7) according to said routing information contained in the header of the packet, said processor means being able to indicate said one of said output terminals to said routing means in response to packets received by said processor means.

2. Switching system according to claim 1, characterized in that said common switching means (SB, TM) operate at a predetermined clock frequency and in that each of said input means (RC) include input storage means (IQ) for storing said signals and having an input portion coupled to said one of said input terminals (R×0 to R×7) and operating at the frequency of the signals supplied to said one of said input terminals, and an output portion coupled to the input of said routing means (RT) and operating at said predetermined clock frequency to supply said stored signals to said common switching means.

3. Switching system according to claim 2, characterized in that the frequencies of at least two of the signals supplied to distinct ones of said plurality of input terminals (R×0 to R×7) are different.

4. Switching system according to claim 3, characterized in that said predetermined clock frequency of said common switching means (SB, TM) is equal to the product of a maximum allowed value of said signal frequency and of said plurality of input terminals (R×0 to R×7).

5. Switching system according to claim 1, characterized in that said routing means (RT) are able to replace the headers of incoming packets by new headers prior to route said packets with said new headers to said common switching means (SB, TM), the value of said new headers being provided to said routing means by said processor means (SPC) in response to control packets supplied to said system (SW) via said one of said input terminals (R×0 to R×7) and transmitted to said processor means via said routing means.

6. Switching system according to claim 1, characterized in that said common switching means (SB, TM) are provided with a time division path (SB) which comprises a plurality of timeslots allocated to distinct ones of said input means (RC) and that, at the occurrence of a time slot, the routing means (RT) of the input means to which said time slot is allocated transmits at least a portion of said packet and the address of said one of said output terminals (T×0 to T×7).

7. Switching system according to claim 2, characterized in that said signal frequency is variable.

8. Switching system according to claim 2, characterized in that it further includes synchronization means (SC) coupled between said one of said input terminals (R×0 to R×7) and said input portion of said input storage means (IQ) and able to provide said signal frequency which is supplied to a control input (II) of said input portion of said input storage means to control the operation thereof.

9. Switching system according to claim 8, characterized in that within a predetermined time interval, relatively larger than the output rate of said packets of said routing means (RT), at least one of said packets is a synchronization packet containing a synchronization pattern and is transmitted to said processor means (SPC) via said routing means, said processor means controlling said synchronization means (SC) to obtain packet synchronization in response to the reception or to the non-reception of said synchronization packet by said processor means within said time interval.

10. Switching system according to claim 2, characterized in that each of said output means (TC) include output storage means (OQ) for storing at least a portion of said packets and having an input portion coupled to said common switching means (SB, TM) and operating at said predetermined clock frequency for entering signals from said common switching means, and an output portion coupled to said one of said output terminals (T×0 to T×7) and operating at the frequency of an output clock (OC) also included in said output means to convey said packets to said one of said output terminals.

11. Switching system acccording to claim 10, characterized in that said frequency of said output clock (OC) is variable.

12. Switching system according to claims 6 or 10, characterized in that each of said output means (TC) further include identification means (IC) coupled to said time division path (SB) and able to read and to recognize said address of said one of said output terminals (T×0 to T×7) amongst said addresses transmitted by said routing means (RT) within one of said timeslots and then to order via a control terminal (OI) said input portion of said output storage means (OQ) to store said packet associated to said one of said timeslots.

13. Switching system (SW) for switching digital signals, grouped in incoming packets having a header, applied to any one of a plurality of input terminals (R×0 to R×7) thereof to any one of a plurality of output terminals (T×0 to T×7) thereof, said switching system including common switching means (SB, TM), input means (RC) coupling said plurality of input terminals to said common switching means, and output means (TC) coupling said common switching means to said plurality of output terminals, characterized in that said input means (RC) include header correction means (HC) to correct faulty ones of headers of said incoming packets.

14. Switching system according to claim 13, characterized in that said header correction means (HC) include means providing valid headers, means for detecting if the header of an incoming packet corresponds to one of said valid headers and means which in response to said detecting means having detected a faulty header select one of said valid headers to replace said faulty header in said incoming packet.

15. Switching system according to claim 14, characterized in that said selected valid header is the valid header which is the nearest to said faulty header.

16. Switching system according to claim 13, characterized in that it includes a plurality of input means (RC) each coupled to one of said input terminals (R×0 to R×7) and each including individual header correction means (HC).

17. Switching system according to claims 1 or 16, characterized in that said individual header correction means (HC) are coupled between said one of said input terminals (R×0 to R×7) and said routing means (RT) and in that they are controlled by said processor means (SPC).

* * * * *